July 27, 1965          G. KIPER          3,196,771

EXPOSURE-CONTROLLING STRUCTURE FOR CAMERAS

Filed March 25, 1963          4 Sheets-Sheet 1

INVENTOR.
GERD KIPER
BY Michael S. Striker
his Attorney

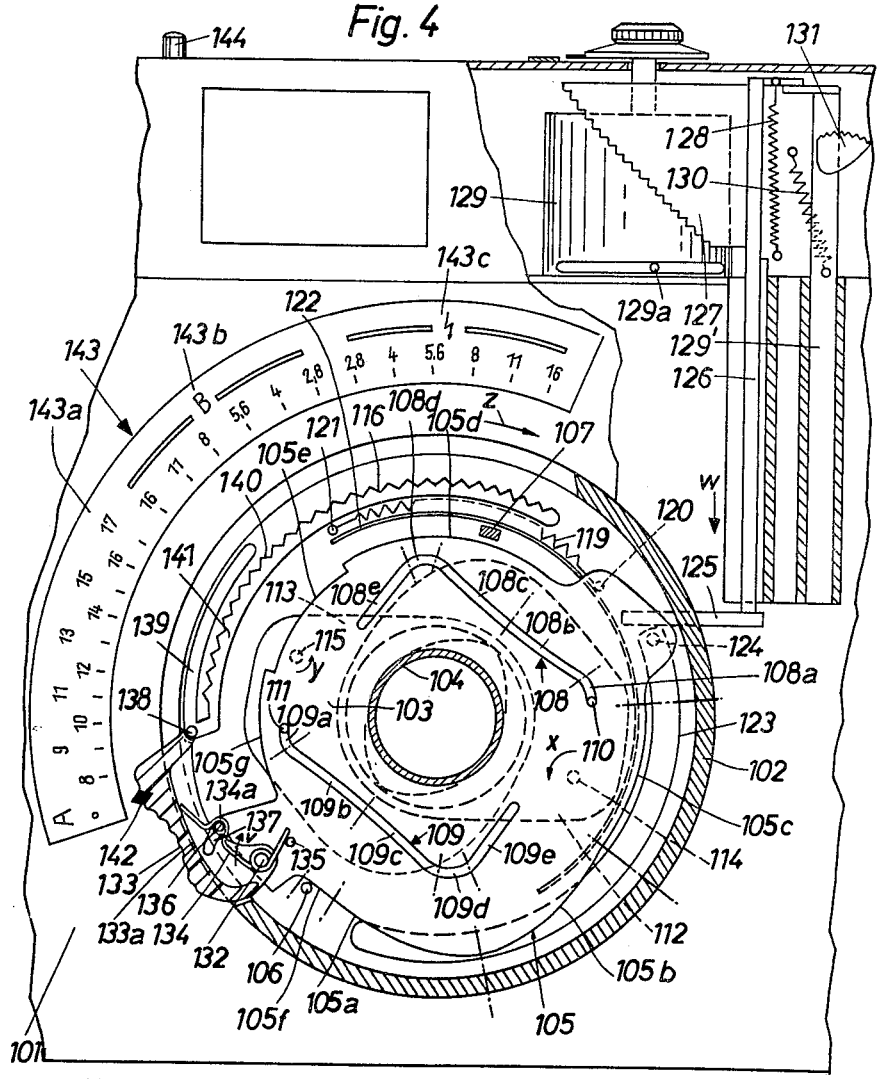

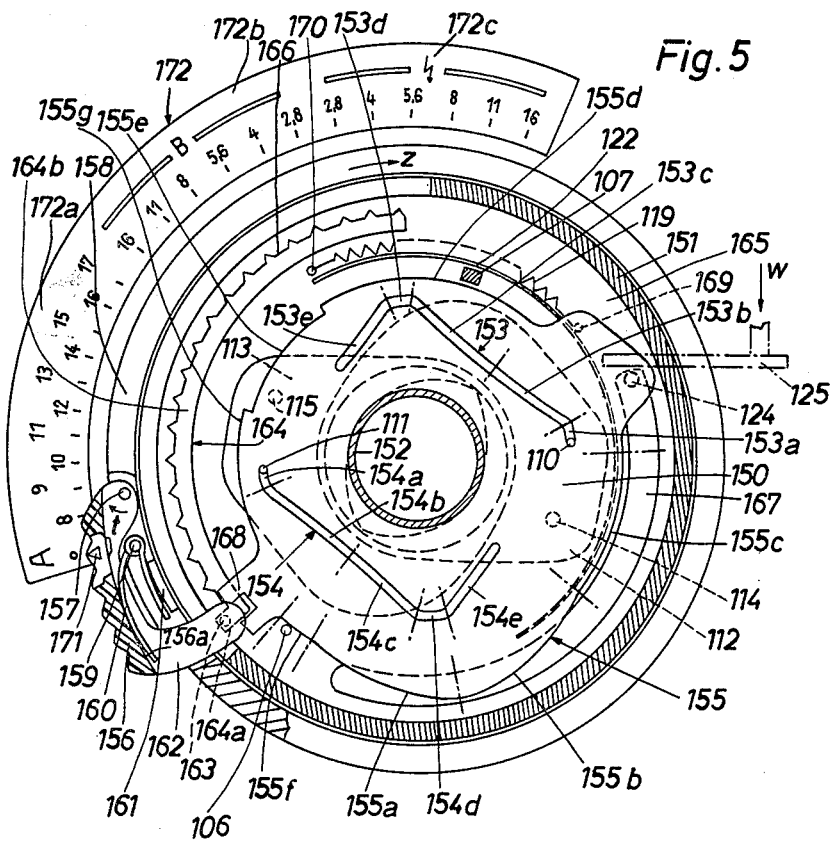

United States Patent Office 3,196,771
Patented July 27, 1965

3,196,771
EXPOSURE-CONTROLLING STRUCTURE
FOR CAMERAS
Gerd Kiper, Unterhaching, near Munich, Germany,
assignor to Agfa Aktiengesellschaft, Leverkusen,
Germany
Filed Mar. 25, 1963, Ser. No. 267,433
Claims priority, application Germany, Mar. 23, 1962,
A 39,793, A 39,794
14 Claims. (Cl. 95—64)

The present invention relates to cameras.

More particularly, the present invention relates to exposure-controlling structure for cameras.

On most conventional cameras it is necessary to actuate at least a pair of adjusting elements in order to be able to adjust both the exposure time and the exposure aperture. This necessity of providing a pair of adjustments renders cameras inconvenient to operate, particularly for amateurs, and it had already been proposed to provide cameras with a single adjustable element which is capable of being actuated for the purpose of adjusting both the aperture and the exposure time. However, in cameras of this latter type there are certain disadvantages. For example, it is only possible to provide one set of combination of exposure times and apertures. In other words for each aperture setting there is only one possible exposure-time setting so that the range of possible use of the camera is greatly limited. Moreover, conventional structures of this type are undesirably complicated, costly, and space-consuming.

It is thus a primary object of the present invention to provide a camera which can have the exposure time and aperture settings made by adjustment of a single element but which at the same time avoids the above drawbacks.

Thus, it is an object of the present invention to provide a camera of the above type where, even though a single element is adjusted for the purpose of setting the exposure time and the aperture, nevertheless it is possible to provide for each of a series of exposure apertures more than one exposure time, so that the camera can be used under widely different circumstances to photograph all types of subjects under all types of conditions.

It is furthermore an object of the present invention to provide a structure of the above type which is exceedingly simple and compact and which at the time requires only a minimum number of parts to be constructed with great precision.

An additional object of the present invention is to provide a structure of the above type where at least part of the adjustments of both the exposure time and aperture can be made automatically or manually at the option of the operator.

Still another object of the present invention is to provide a structure of the above type which can be at least partly operated either manually or automatically and which at the same time does not require the operator to manipulate any special elements for the purpose of converting the structure from automatic to manual operation or from manual to automatic operation.

With these objects in view the invention includes, in a camera, a support means which includes a stationary wall located in a plane normal to the optical axis. A movable wall is carried by the support means for movement relative to the stationary wall of the support means. The camera also includes a diaphragm blade means and a connecting means which connects the diaphragm blade means to one of the above walls for movement relative thereto. A pin-and-slot means connects the diaphragm blade means to the other of the above walls and includes at least one slot of a predetermined curvature which will position the diaphragm blade means to provide an exposure aperture which is determined by the position of the movable wall relative to the stationary wall. Finally, an exposure-time setting means is carried by the movable wall for movement therewith and provides for each exposure aperture determined by the position of the movable wall a corresponding exposure time also determined by the position of the movable wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a partly diagrammatic, partly sectional front elevation showing a third embodiment of a structure according to the present invention, the embodiment of FIG. 4 being adapted to set the exposure time and aperture automatically as well as manually; and FIG. 5 illustrates another embodiment of a structure capable of setting the exposure time and aperture both automatically and manually.

Figure 1:
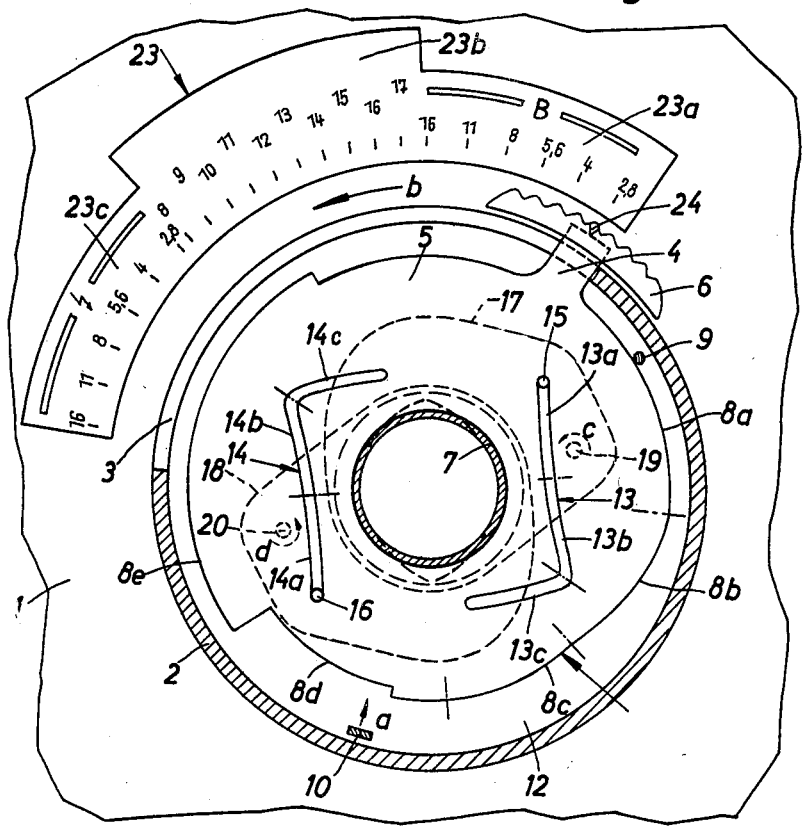
FIG. 1 is a partly sectional and partly diagrammatic view showing in elevation one possible embodiment of an exposure-controlling structure according to the present invention.

Referring now to FIG. 1, it will be seen that the structure illustrated therein includes a support means which includes the front wall 1 of the camera as well as the outer housing 2 of the objective, this outer tubular housing 2 being fixedly carried by the front wall 1. The tubular wall 2 is formed with a slot 3 through which extends an arm 4 which is fixed to and projects from a turnable or movable wall 5 which is supported by the support means for turning movement about the optical axis. The outer end of the arm 4 is located at the exterior of the objective housing 2 and fixedly carries a finger-piece 6 which is capable of being engaged by the operator, so that the parts 4 and 6 form a manually-engageable means which is fixed to the turnable wall 5 so that the operator can turn the latter, and this turnable wall 5 forms the single adjusting element which is positioned for the purpose of setting both of the exposure time and aperture in a manner described below.

The support means includes also an inner tube 7 through which light reaches the film when an unillustrated shutter is opened, and it is the exterior surface of the tube 7 which extends through the wall 5 to support the latter for turning movement about the optical axis.

An exposure-time setting means is carried by the movable wall 5 for movement therewith so that the exposure time will be determined by the position of the movable wall 5, and the exposure-time setting means is illustrated as taking the form of an edge portion of the wall 5, at the outer periphery thereof, which has a predetermined curvature providing camming edges which will determine the exposure time according to the angular position of the wall 5. Thus, it will be seen that the camming edge 8 formed by the exterior periphery of the wall 5 has curved portions 8a, 8b, 8c, 8d and 8e, the several portions 8a–8e having curvatures and radial distances from the optical axis which will provide not only selected exposure times but also the possibility of bulb exposures according to which the exposure time is manually determined by the operator. The curved, camming edge portions 8a, 8b, and 8c engage a pin 9 which is fixed to a conventional adjusting lever of a conventional retarding mechanism which is connected in a known way to an unillustrated conventional shutter for the purpose of controlling the exposure time. Thus, the camming edge portions 8a, 8b, 8c will determine the distance of the pin 9 from the optical axis and will in this way determine, in a manner well known in the art, the exposure time. The curved portions 8d and 8e cooperate with an element 10 of a bulb-exposure controlling lever which is also conventional and well known in the art. When the curved portion 8d confronts the element 10, it is possible to move the element 10 in the direction of the arrow $a$ toward the optical axis to a position nearer to the optical axis than when the curved edge portion 8e confronts the element 10, so that only when the curved edge portion 8d confronts the element 10 is it possible for the operator to provide bulb exposures in a manner described below. The curved portions 8a and 8c respectively form parts of a pair of circles of different diameters whose centers are in the optical axis, while the curved portion 8b merges into the curved portions 8a and 8c and provides a gradual change from the exposure time provide by curved portion 8a to the exposure time provided by curved portion 8c. The curved portion 8e extends along a circle whose center is in the optical axis and whose radius is sufficiently large to prevent movement of the element 10 toward the optical axis so as to prevent bulb exposures while the curved portion 8d when it confronts the member 10 enables the latter to be moved in the direction $a$ through a distance sufficient to enable the operator to provide an exposure time in accordance with the length of time that the operator manually holds the shutter open.

Figure 2:
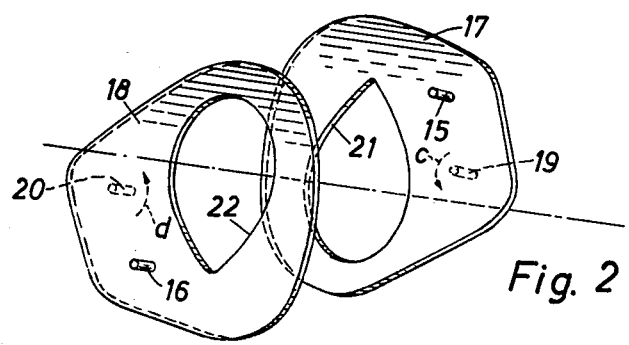
FIG. 2 is a perspective illustration of a pair of diaphragm blades which are used in the embodiment of FIG. 1.

The structure includes a blade means the details of which are illustrated in FIG. 2. Thus, the blade means includes a pair of diaphragm blades 17 and 18 which respectively are fixedly connected with pivot pins 19 and 20 supported for turning movement in openings formed in the wall 12, of the support means, this wall 12 being in a plane which is normal to the optical axis and being stationary so that the particular exposure time is determined by the position of the movable wall 5 relative to the stationary wall 12, and also the exposure aperture will be determined by the position of the wall 5 relative to the stationary wall 12, as will be apparent from the description below.

A pin-and-slot means connects the diaphragm blade means 17, 18 to the movable wall 5 for determining the position of the diaphragm blades according to the position of the movable wall 5, and in the particular example illustrated the pin-and-slot means includes a pair of pins 15 and 16 which are respectively fixed to the pair of blades 17 and 18 and which are respectively received in a pair of slots 13 and 14 which are respectively formed in the movable wall 5. It will be noted that while the slots 13 and 14 are of identical configurations they are oppositely positioned with respect to each other and thus the turning of the wall 5 will result in equal and opposite movements of the blades 17 and 18 about the axes of the pins 19 and 20, respectively, as indicated by the arrows $c$ and $d$ in FIGS. 1 and 2. The slot 13 is provided with curved portions 13a, 13b, 13c, while the slot 14 is provided with corresponding curved portions 14a, 14b, 14c, and each of these portions of the slots 13 and 14 is capable of positioning the corresponding diaphragm blade throughout a given range of positions so that with these slots 13 and 14 it is possible to provide in each of the slot portions a series of apertures which may be the same as those of other slot portions but which will provide a different sequence in the changeover from one aperture to another, and in addition the curved portions of the slots 13 and 14 are so positioned with respect to the exposure-time setting means formed by the periphery of the movable wall 5 that a certain range and sequence of exposure apertures will be provided for a curved portion of the peripheral edge of the wall 5 with different ranges and sequences being provided respectively for the different camming edge portions which determine the exposure time, so that in this way it is possible to provide for each of a series of exposure apertures more than one exposure time, as will be apparent from the description below. Thus, when the operator turns the wall 5 in the direction of the arrow $b$ shown in FIG. 1, the slot portions 13a, 14a, and 13c, 14c respectively cooperate with the pins 15 and 16 to respectively turn the blades 17 and 18 in the directions $c$ and $d$, while when the pins 15 and 16 are respectively engaged by the slot portions 13b, 14b the blades 17 and 18 will be turned respectively in directions opposite to the directions $c$ and $d$. It will be noted that in the position shown in FIG. 1 the openings 21 and 22 of the blades 17 and 18 overlap each other to the greatest extent so that the greatest aperture is provided, and thus when the blades 17 and 18 respectively turn in the directions of the arrow $c$ and $d$ the extent to which the openings 21 and 22 overlap diminishes so that the exposure time becomes smaller, and of course when the blades 17 and 18 turn in the directions opposite to that indicated by the arrows $c$ and $d$, respectively, the exposure aperture will become larger. It should be noted that it is not essential that the slots and camming edges which determine the aperture and exposure times be formed in a single flat plate. In the event that is is required by the particular structure of the shutter, it is also possible to provide these slots and camming edges in plate portions which are fixed to each other for turning movement as a unit about the optical axis but which are displaced with respect to each other along the optical axis and respectively located in planes normal to the optical axis.

In order to enable the operator to provide selected exposures, a scale 23 is mounted on the front wall 1 of the camera, and the finger-piece 6 carriers an index 24 which is adapted to be aligned with selected graduations of the scale 23. The scale 23 is provided with three sections 23a, 23b, 23c which are respectively positioned so as to provide proper indications for the corresponding angular positions of the slots 13 and 14 and the peripheral edge of the movable wall 5. The section 23a of the scale 23 provides graduations indicating various apertures from 2.8 to 16, and this section includes the symbol B for indicating that bulb exposures can be made with this portion of the scale. The intermediate section 23b of the scale 23 carries graduations indicating light values from 8 to 17, and the remaining section 23c of the scale 23 again includes graduations indicating apertures from 2.8 to 16, and this section of this scale carries a symbol indicating that this section is to be used for making exposures with flash illumination.

If, for example, it is desired to make a bulb exposure with an aperture of 8, then the operator will simply turn the wall 5 in the direction of the arrow $b$ of FIG. 1 until the index 24 is aligned with the graduation 8 in the bulb-exposure section 23a of the scale 23, and during this turning of the wall 5 the portions 13a and 14a of the slots 13 and 14 will cooperate with the pins 15 and 16 to turn the blades 17 and 18 in the directions of the arrows $c$ and $d$ until the aperture provided by the blades corresponds to the value 8. Then the operator will actuate the shutter release, and the shutter will remain open as long as the operator manually engages the shutter-release plunger.

During the turning of the wall 5 in this manner the circular edge portion 8a rides along the pin 9 without moving the latter so that the exposure time remains unchanged and in the particular example the exposure time will be set in this position to provide the shortest exposure time of, for example, 1/500 sec. Of course, since the operator will manually provide an exposure time which is much longer than this extremely short exposure time, the particular setting of the pin 9 at this time will have no influence on the exposure time. As long as the index 24 cooperates with the section 23a of the scale 23, the curved edge portion 8d of the wall 5 will confront the element 10 so that it will be possible for the operator to manually maintain the shutter open for as long as the operator desires.

Thus, the curved edge portion 8d of the wall 5 and the slot portions 13a and 14a thereof enable the operator to provide any manually-determined exposure time with any selected aperture within the given range of apertures which the camera can provide.

If the operator turns the wall 5 through such a distance that the index 24 moves beyond the scale section 23a and into the section 23b, the curved edge portion 8b will reach the pin 9, and as the operator continues to turn the wall 5 in the direction of the arrow b the exposure times will become gradually longer as the curved edge portion 8b rides along the pin 9. The angular position and length of the curved edge portion 8b is such that this curved edge portion will engage the pin 9 as long as the index 24 cooperates with the intermediate scale section 23b, and at this time it is the curved edge portion 8e which will confront the element 10 so that the operator cannot make a bulb exposure. Thus, it is at this time that the adjustment of the position of the pin 9 will set the retarding mechanism to control the exposure time and automatically determine the exposure time. Therefore as the operator continues to turn the wall 5 through the range where the index 24 cooperates with the scale 23b the exposure times will become gradually longer while at the same time the slot portions 13b and 14b cooperate with the pins 15 and 16 to turn the blades 17 and 18 in directions opposite to those indicated by the arrows c and d, respectively, and thus at this time the apertures will become gradually larger also. As a result there is provided while the index 24 cooperates with the scale section 23b gradually longer exposure times cooperating with gradually larger exposure apertures, and these combinations of exposure times and apertures will provide different light values as indicated by the graduations in the intermediate scale section 23b. The longest exposure time which is provided at the end of the curved edge portion 8b which is most distant from the curved edge portion 8a may be, for example, $\frac{1}{30}$ sec. Thus, the curved edge portion 8b in combination with the slot portions 13b and 14b enable the operator to provide continuously changing exposure times in combination with continuously changing apertures so as to provide a selected light value as indicated by the scale section 23b.

When the operator turns the wall 5 to a position which provides cooperation between the index 24 and the scale section 23c, the curved camming edge portion 8c of the exposure-time setting means will engage the pin 9, and this curved portion 8c is located along a circle whose radius is such that the pin 9 will be maintained at a position providing an exposure time of $\frac{1}{30}$ sec., which is an exposure time suitable for flash illumination. It will be noted that at this time also the curved edge portion 8e confronts the element 10 to prevent bulb exposures from being made. Moreover, the slot portions 13c and 14c will respectively cooperate with the pins 15 and 16 at this time so as to control the positions of the blades 17 and 18, and the curvature of these slot portions 13c and 14c is such that as the operator continues to turn the wall 5 in the direction of the arrow b the blades 17 and 18 will again turn in the direction of the arrows c and d, respectively, so that the size of the aperture will become gradually smaller and it will be noted that the aperture graduations extend from 2.8 at the beginning of the scale section 23c to the aperture 16 at the end of the section, so that at this time it is the curved edge portion 8c and the slot portions 13c and 14c which enable the operator to provide for one particular exposure time which is suitable for exposures with flash illuminations at selected apertures.

Figure 3:
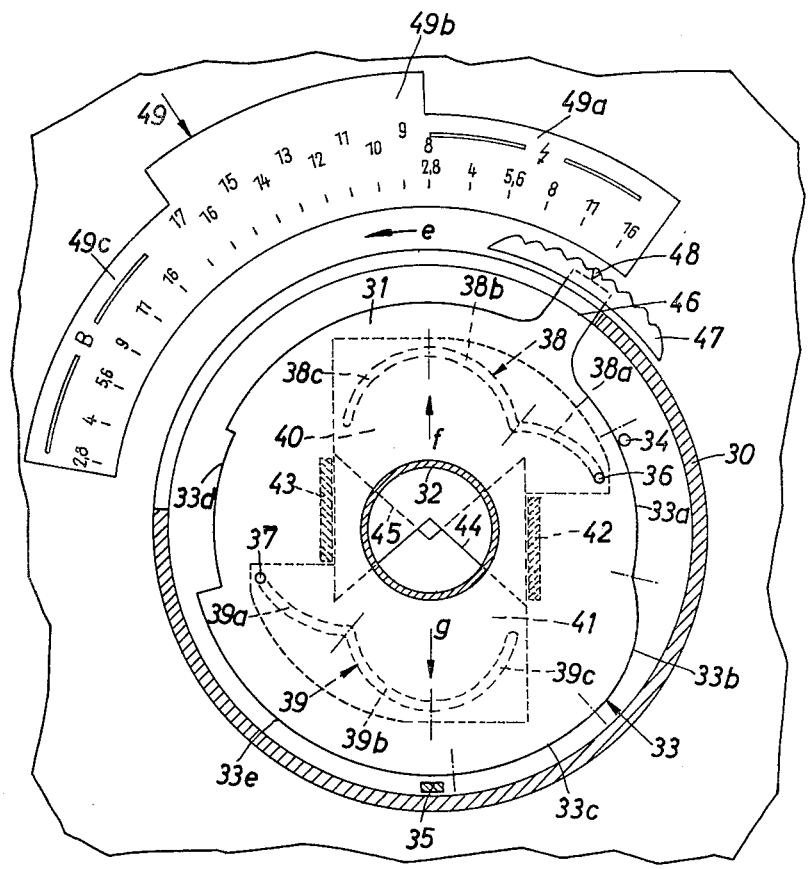
FIG. 3 is a partly diagrammatic and partly sectional view of another embodiment of the invention which uses diaphragm blades constructed differently from those of FIG. 2 and which uses a control structure which is also constructed differently from that of FIG. 2.

According to the embodiment of the invention which is illustrated in FIG. 3, there is also provided a turnable wall 31 which is the only element which requires adjustment in order to determine the exposure, this turnable wall 31 being located within the objective housing and supported by the inner tube 32 thereof for turning movement about the optical axis. The outer peripheral edge of the wall 31 again is suitably shaped so as to form an exposure-time setting means, and this outer edge includes the sections 33a, 33b, 33c, 33d and 33e. The sections 33a–33c cooperate with a pin 34 fixed to a turnable lever of a conventional retarding mechanism so as to control the exposure time of a conventional unillustrated shutter, while the curved sections 33d and 33e cooperate with the element 35 of a bulb-exposure controlling lever. These curved sections 33a–33e at the periphery of the movable wall 31 are shaped in substantially the same way as the sections 8a–8e of FIG. 1. However, it will be noted that in the case of FIG. 3 the curved edge portion 33a is located nearer to the optical axis than the curved edge portion 33c, so that the curved edge portion 33a will provide the longest exposure time of for example $\frac{1}{30}$ sec., while the curved edge portion 33c will provide a shortest exposure time of, for example, $\frac{1}{500}$ sec. Also, it will be noted that the curved edge portions 33e and 33d have their positions reversed as compared to the positions of the curved edge portions 8d and 8e.

In the embodiment of FIG. 3, the blade means takes the form of a pair of diaphragm blades 40 and 41 which are again connected by a suitable connecting means to the stationary wall of the support means, but while the connecting means 19 and 20 of FIGS. 1 and 2 connects the blades 17 and 18 to the stationary wall 12 for turning movement relative thereto, the connecting means of FIG. 3 connects the blades 40 and 41 to the stationary wall for bodily shifting movement relative thereto. For this purpose the stationary wall fixedly carries a pair of guides 42 and 43 between which sections of the blades 40 and 41 are located so that in this way the blades are guided for slidable vertical movement, as viewed in FIG. 3, with respect to the optical axis. In the embodiment of FIG. 3 also there is a pin-and-slot means interconnecting the movable wall 31 with the diaphragm blade means, but in this embodiment it is the blades themselves which are provided with the slots while the movable wall 31 carries the pins. Thus, it will be seen that the movable wall 31 fixedly carries pins 36 and 37 respectively received in slots 38 and 39 of the blades 40 and 41, and these slots 38 and 39 again have sections 38a–38c and 39a–39c which are angularly positioned with respect to the curved edge portions at the periphery of the wall 31 in such a way that when certain curved slot portions engage the pins 36 and 37 certain curved edge portions of the wall 31 will engage the pin 34, and in the same way sections of a scale 49 will cooperate with an index 48 of a finger-piece 47 which is fixedly carried by an arm 46 of the wall 31, this arm 46 extending through a slot formed in the outer objective housing 30. The portions of the blades 40 and 41 which are respectively located betwen the guides 42 and 43 are respectively formed with V-notches 44 and 45 which overlap each other in accordance with the vertical positions of the blades to provide different apertures, as is apparent from FIG. 3. The curved slot portions 38a, 38c and 39a, 39c are curved in such a way that when the pins 36 and 37 engage these slot portions while the wall 31 is turned in the direction of the arrow e the blades 40 and 41 will respectively be shifted in the direction of the arrows f and g, so that the aperture will become larger, while when the slot portions 38b and 39b engage the pins 36 and 37 during the turning of the wall 31 in the direction of the arrow e the blades 40 and 41 will respectively move in opposite directions to provide gradually smaller exposure apertures.

The scale 49 is again divided into three sections 49a–49c, but the section 49a is provided with aperture graduations adapted to be used with flash illumination while the intermediate section 49b is provided with light value graduations and the section 49c is provided with aperture graduations and is used when making bulb exposures.

In order to make an exposure with flash illumination the operator will manually turn the wall 31 in order to locate the index 48 in alignment with a selected graduation of the scale section 49a. This time the curved edge portion 33a will ride along the pin 34 without moving the latter toward and away from the optical axis and maintaining the longest exposure time of, for example, 1/30 sec., and at the same time the pins 36 and 37 will move along the slot portions 38a and 39a, respectively, so as to provide gradually larger exposure apertures, and when a selected aperture is reached the operator will make the exposure with the flash illumination.

If the exposure is to be made according to a light value which is determined from a hand-held exposure meter, for example, then the operator will align the index 48 with a selected light value of the intermediate scale section 49b, and as long as the index 48 is aligned with the intermediate scale section 49b, the curved edge portion 33b will engage the pin 34 to control the exposure time and the pins 36 and 37 will ride in the curved slot portions 38b and 39b, respectively. It will be noted that as the wall 31 is turned in the direction of the arrow e while the curved edge portion 33b engages the pin 34, this pin 34 will be displaced away from the optical axis so as to provide gradually shorter exposure times, and at the same time the plates or blades 40 and 41 will move in directions opposite to the arrows f and g, respectively, to provide gradually smaller apertures, so that at this time the structure will provide predetermined combinations of apertures and exposure times both of which become gradually smaller. When the end of the edge portion 33b most distant from the edge portion 33a reaches the pin 34 the shortest exposure time of, for example, 1/500 sec. will be provided.

When the operator places the index 48 opposite the scale section 49c, the curved edge portion 33c will be in engagement with the pin 34, and this curved edge portion 33c extends along a circle whose center is in the optical axis and maintains the pin 34 at the position providing the shortest exposure time. However, the movement of the wall 31 at this time will cause the pins 36 and 37 to ride along along the slot portion 38a and 38c again moving the blades 40 and 41 in the direction of the arrows f and g so as to increase the apertures and it will be seen that as the index 48 moves in the direction of the arrow e along the scale section 49c the graduations of this latter scale indicate gradually larger exposure apertures. At this time the curved edge portion 33d at the periphery of the wall 31 confronts the element 35 so that the operator can shift the latter inwardly toward the optical axis in order to make a bulb exposure with any one of the diaphragm settings indicated in the scale 49c.

Thus, it will be seen that with the embodiment of FIG. 3 also there are three distince choices for the type of exposure controls desired. With both embodiments it is possible to provide any one of a series of selected apertures either with bulb exposure or with an exposure time suitable for flash illumination, and in addition it is possible to provide a set of exposure times and apertures which will correspond to the light values indicated by the intermediate scale sections. Of course, the indicated settings of exposure time and aperture are only by way of example and also the manner in which the apertures and exposure times change is also illustrated only by way of example. However, it is preferred to provide at the end of one of the ranges and at the beginning of the next range exactly the same exposure time and aperture so that in this way the various camming edge portions and slot portions can be located directly next to each other in a minimum amount of space. Moreover, when using the intermediate scale sections it is not at all essential to adjust the apertures and exposure times simultaneously, and instead it is possible, for example, to gradually increase or decrease the exposure time while the aperture remains unchanged and then to change the aperture while the exposure time remains unchanged, suitable light values for such an arrangement being indicated by the graduations of the intermediate scale sections.

It will be noted that with the embodiment of FIG. 1 it is only the wall 5 which is provided with the camming edges which determine the exposure time as well as with the curved slot portions which determine the exposure apertures, so that only the element 5 need be constructed with precision. In the case of FIG. 3, however, the blades 40 and 41 must in any event be precisely constructed in order to cooperate properly with the guides 42 and 43, so that in this case it is preferred to provide the slots 38 and 39 in the blades inasmuch as it is the blades which are constructed precisely in this embodiment, and of course in addition the curved edge at the periphery of the wall 31 is also precisely constructed.

Referring to FIG. 4, there is shown therein a support means which includes the front wall 101 of the camera, this front wall carrying the objective housing 102 within which is located the movable wall 103 which forms the single adjusting element of this embodiment for determining the exposure. An inner tube 104 of the objective assembly extends through a central opening of the wall 103 to support the latter for turning movement. The exterior edge portion of the wall 103 again is provided with a curvature enabling this edge to form an exposure-time setting means, and thus it will be seen that the exterior edge 105 of the wall 103 includes the portions 105a, 105b, 105c, 105d, 105e, 105f and 105g. The edge portions 105a–105c respectively engage the pin 106 of an adjustable lever of a retarding mechanism which in a well known manner controls the exposure time which will be provided by an unillustrated and purely conventional shutter. The curved edge portions 105d, 105e and 105g cooperate with the element 107 of the known bulb-exposure structure. The curved edge portions 105a and 105b are curved in such a way that when the wall 103 is turned in the direction of the arrow z, these curved edge portions 105a and 105b will cooperate with the pin 106 to provide any exposure time between the longest exposure time of, for example, 1/30 sec. and the shortest exposure time of, for example, 1/500 sec. The curved edge portions 105c, 105d, 105e and 105g respectively form parts of circles of different diameters whose centers are respectively in the optical axis. The section 105c is arranged so that it will maintain the pin 106 in a position in which it will provide a constant exposure time suitable for flash exposure, this exposure time being for example, 1/30 sec. The sections 105d and 105g are so arranged that when they confront the element 107 they will prevent the element 107 from being moved toward the optical axis so as to prevent bulb exposures from being made, while the curved edge portion 105e has a radius small enough to permit the element 107 to be moved toward the optical axis to provide bulb exposures when the curved edge portion 105e confronts the element 107, and thus at this time it will be possible for the operator to maintain the shutter open as long as the operator maintains the shutter-release plunger 144 depressed.

The embodiment of FIG. 4 includes a pair of diaphragm blades identical with those shown in FIG. 2, and with this embodiment the support means includes the stationary wall 116 which is parallel to the movable wall 113 and which is in a plane normal to the optical axis, the blades 112 and 113, which are respectively identical to the blades 17 and 18 described above fixedly carrying the pivot pins 114 and 115 which turn in suitable bores of the stationary wall 116, and in addition the blades 112 and 113 fixedly carry pins 110 and 111 which are respectively received in the control slots 108 and 109 which are respectively formed in the movable wall 103. The control slot 108 is provided with five curved portions 108a–108e, while the identical and oppositely arranged slot 109 has the five portions 109a–109e. The blades 112 and 113 are respectively formed with openings identical with the openings 21 and 22 described above. The portions 108b, 109b and 108e, 109e of the slots 108 and 109 are so shaped that when the wall 103 turns in the direction of the arrow z the pins 110 and 111 turn the blades in the directions of the arrows x and y shown in FIG. 4, and thus at this time the exposure aperture will become smaller, while the curved portions 109c and 108c will during turning of the wall 103 in the direction of the arrow z provide opposite turning of the blades to increase the size of the aperture. The curved portions 108a, 109a and 108d, 109d respectively extend along circles whose centers are in the optical axis so that when the pins 110 and 111 are located in these portions of the slots there will be no movement of the blades 112 and 113.

A return spring 119 is connected at one end to a pin 120 which is fixedly carried by the wall 103 and the other end of the spring 119 is fixed to a stationary pin 121 carried by the wall 116, so that the spring 119 urges the wall 103 to turn in a direction opposite to that indicated by the arrow z. The wall 116 carries an arcuate rib 122 which engages and guides the spring 119 so that this spring cannot engage the blades.

In order to provide for automatic positioning of the wall 103 according to the lighting conditions, the wall 103 carries a pin 124 which extends parallel to the optical axis through a slot 123 which is formed in the stationary wall 116, this slot 123 extending along a circle whose center is in the optical axis so that as the wall 103 turns about the optical axis the pin 124 which is fixed to the wall 103 will simply move along the slot 123. The pin 124 is located in the path of movement of a projection 125 which is fixed to and extends from an elongated rod 126 which is guided for vertical movement in the direction of the arrow w. This rod 126 fixedly carries a scanning plate 127 which has a stepped scanning edge which cooperates with the turnable pointer 129a of a galvanometer 129 which is connected electrically to a photosensitive element such as a photocell, for example, so that the pointer 129a assumes an angular position determined by the lighting conditions and of course the extent to which the rod 126 can move down will be determined by engagement of the scanning edge of the plate 127 with the pointer 129a, so that in this way the extent of downward movement of the rod 126 is also determined by the lighting conditions. Thus, during downward movement of the rod 126 the projection 125 will engage the pin 124 and will turn the movable wall 103 to an angular position which is determined by the lighting conditions, assuming that the operator chooses to have the exposure automatically determined in the manner described below. A spring 128 is connected at one end to a stationary pin and at its opposite end to another projection of the rod 126 for urging the latter downwardly in the direction of the arrow w. A second rod 129′ extends parallel to the rod 126 and is also guided for vertical movement, and a spring 130 which is stronger than the spring 128 urges the rod 129′ back to the illustrated rest position shown in FIG. 4, this rod 129′ carrying a finger-piece 131 capable of being engaged by the operator so that the operator can move the rod 129′ downwardly in opposition to the spring 130. When the rod or finger-piece 131 is released the spring 130 returns the rod 129′ to the position illustrated in FIG. 4, and a projection on the top of the rod 129′ engages the underside of the projection of rod 126 to which the spring 128 is connected, so that in this way the stronger spring 130 compels the rod 126 to assume the position illustrated in FIG. 4 in opposition to the spring 128, and of course in this rest position the scanning plate 127 is spaced from the pointer 129a so that this pointer can assume whatever angular position is called for by the lighting conditions. When the operator engages the finger-piece 131 to move the rod 129 downwardly, the spring 128 will be free to move the rod 126 in the direction of the arrow w.

In order to provide for manual positioning of the movable wall 103 of FIG. 4, a manually-engageable means is also connected to the wall 103, and in this embodiment the manually-engageable means takes the form of a lever 133 which is pivotally supported by a pin 132 which is fixed to the wall 103. A spring 134 is coiled about the pin 132 and has one end engaging a pin 135 which is also fixed to the wall 103, while the other end of the spring 134 engages a surface portion 133a of the lever 133, and thus the spring 134 urges the lever 133 to turn in a direction opposite to that indicated by the arrow v in FIG. 4. The end portion of the spring 134 which engages the surface 133a is formed with a substantially U-shaped section 134a which receives a pin 136 which is also fixed to the movable wall 103, and the lever 133 is formed with a curved notch 137 aligned with the pin 136 and extending along a circle whose center is in the axis of the pin 132, so that the operator can turn the lever 133 in opposition to the spring 134 in the direction of the arrow v until the inner end of the notch 137 engages the pin 136. The lever 133 fixedly carries a pin 138 which extends parallel to the optical axis and which serves both as a guide member and as a detent member, as will be apparent from the description below. In the rest position of the parts shown in FIG. 4, the pin 138 of the lever 133 is located at the entrance end of an elongated curved slot 139 which is formed in the stationary wall 116, and this slot 139 extends along a circle whose center is in the optical axis. However, when the operator turns the lever 133 in the direction of the arrow v, the pin 138 will become aligned with a second curved slot 141 formed in the plate 116 and also located along a circle whose center is in the optical axis, and the outer edge of the slot 141 is in the form of teeth 140 which act as detent elements to cooperate with the pin 138 for maintaining the lever 133 and thus the movable wall 103 in manually selected angular positions.

The lever 133 also carries an index 142 which cooperates with the scale 143 carried by the front wall 101 of the camera, and the scale 143 carries the graduation A which indicates the location in which the index 142 should be placed when the camera is to be operated automatically by the light-responsive structure described above and shown at the upper right portion of FIG. 4. The scale 143 has a section 143a including graduations which indicate light values, an intermediate section 143b having a series of graduations indicating aperture sizes and also carrying the symbol for bulb exposures, and finally a section 143c also provided with graduations indicating aperture sizes and carrying a symbol indicating exposures with flash illumination.

In order to automatically determine the exposure, the index 142 is aligned with the graduation A, as indicated above, and the operator depresses the rod 29 in opposition to the spring 130 so that the rod 126 can follow the downward movement of the rod 129′, the rod 126 at this time being moved by the spring 128, and this movement of the rod 126 in the direction of the arrow w will continue until the scanning edge of the scanning plate 127 engages the pointer 129a of the galvanometer 129. The downward movement of the rod 126 is transmitted through its projection 125 to the pin 124 so that the latter is displaced along the slot 123 and of course the movable wall 103 is angularly turned in the direction of the arrow z at this time, the spring 128 of course being stronger than the spring 119. The initial turning of the movable wall 103 from the position shown in FIG. 4 causes the slot portions 108a and 109a of the wall 103 to move relative to the pins 110 and 111, and simultaneously the curved portion 105f of the wall 103 moves along the exposure-time determining pin 106. Moreover, the pin 138 of the lever 133 will at this time enter into the slot 139 to an extent greater than that indicated in FIG. 4, so that even if the operator should press the lever 133 at this time the pin 138 will cooperate with the inner edge of the slot 139 to prevent turning of the lever 133. Moreover, the end of the slot 139 which is distant from the pin 138 in the position of the parts shown in FIG. 4 limits the extent to which wall 103 can be turned during automatic operation of the structure. During these initial operations there is no influence either on the exposure time or on the aperture. However, as soon as the slot portions 108b and 109b reach the pins 110 and 111 during the continued turning of the wall 103 in the direction of the arrow z, the diaphragm blades 112 and 113 start to turn in the directions of the arrows x and y of FIG. 4 so as to gradually reduce the size of the aperture. At the same time the curved edge portion 105a of the wall 103 moves along the pin 106 so as to adjust the exposure time, and thus at this time the continued turning of the wall 103 gradually reduces both the aperture and the exposure time. Inasmuch as the exposure time and aperture are controlled by camming edges it is possible to provide combinations of exposure time and aperture which will match the individual light values. For example, as was indicated above, instead of providing an arrangement where the aperture and exposure time both are reduced simultaneously it is possible to provide an arrangement where one or the other of these factors is initially influenced and then the remaining factor is adjusted. Thus, the slots 108 and 109 and the curved edge portion 105a can be provided with a curvature which will either initially reduce the exposure time while the aperture remains constant and then during the latter part of the turning of the wall 103 at this time reduce the aperture while the exposure time remains constant, or it is possible to first reduce the aperture and then the exposure time.

The automatic setting is terminated as soon as the scanning edge of the scanning plate 127 engages the pointer 129a. The only additional operation is the manual depression of the plunger 144 in order to trip the shutter so as to make the exposure. Of course, when the light-responsive means 124–129 determines the exposure, it is possible to read the light value of this automatically-determined exposure on the scale 143a since the index 142 will be automatically positioned in alignment with the automatically-provided light value.

After the exposure has been made the operator will release the finger-piece 131 so that the spring 130 will return the rod 129′ to its rest position, and at this time the projection on the top end of the rod 129′ will engage the projection at the top end of the rod 126 to return the latter in opposition to the spring 128 to the rest position illustrated in FIG. 4, and in this way the spring 119 will be capable of returning the wall 103 to its starting position. In this initial position of the parts the aperture has its largest size and the exposure time has its longest duration. It will be noted that the entrance ends of the slots 139 and 141 communicate with each other at a radial slot portion formed in the plate 116, and this substantially radial slot portion at the entrance ends of the arcuate slot portions 139 and 141 engages the pin 138 to limit the turning of the wall 103 by the spring 119 in a direction opposite to that indicated by the arrow z.

In the event that it is desired to manually set the exposure time and aperture, the operator will turn the lever 133 in the direction of the arrow v until the end of the notch 137 engages the pin 136, and in this way the pin 138 is aligned with the slot 141, and then the lever 133 is turned in the direction of the arrow z so as to displace the pin 138 along the slot 141 and simultaneously turn the wall 103 to provide in a manual manner the same series of settings which can be provided automatically in the manner described above. If the index 142 is at this time aligned with the light value 8 of the scale section 143a, the wall 103 has been turned through an angular distance sufficient to have displaced the slot portions 108a and 109a through their entire length with respect to the pins 110 and 111 and also the entire curved edge portion 105f has been displaced with respect to the pin 106 so that the pin 106 is now at the beginning of the curved edge portion 105a while the pins 110 and 111 are at the beginning of the curved slot portions 108b and 109b. The bulb-exposure controlling element 107 is however still confronted by the curved edge portion 105d, as was the case during automatic setting, so that a bulb exposure cannot be made. Continued turning of the wall 103 will continuously reduce the size of the aperture and will also continuously shorten the exposure time, the slot portions 108b and 109b and the curved edge portion 105a producing these results at this time due to manual turning of the wall 103 in the same way that these settings were obtained during automatic turning of the wall 103. When the index 142 is located in alignment with the selected light value the lever 133 is released and the spring 134 urges the lever in a direction opposite to that indicated by the arrow v until the pin 138 engages one of the teeth 140 to cause the detent structure to releasably hold the wall 103, in opposition to the spring 119, in the selected angular position.

Of course, instead of providing settings according to light values, it is possible to provide exposures with the scale section 143b where bulb-exposures will be made with the aperture selected according to the alignment of the index 142 with one of the graduations of the scale section 143b. When the index 142 reaches the scale section 143b, the slot portions 108c and 109c respectively reach the pins 110 and 111 so that the continued turning of the wall 103 in the direction of the arrow z at this time gradually increases the size of the aperture. Of course, at this time the curved edge portion 150e will confront the element 107 so that the operator can depress the plunger 144 in order to maintain the shutter open as long as desired, and during this period the curved edge portion 105b will ride along the pin 106 to cause the exposure time to become gradually longer, but these exposure times are such a small fraction of the time which is manually provided by depression of the plunger 144 that they have no influence on the duration of the bulb exposure.

As soon as the index 142 reaches the scale section 143c the wall 103 is turned through a very small angle in order to displace the entire curved slot portions 108d and 109d past the pins 110 and 111, and the slot portions 108e and 109e reach these pins when the index 142 reaches the initial graduation 2.8 of the scale section 143c. The continued turning of the plate 103 in the direction of the arrow z at this time will cause the aperture to become gradually smaller. At the same time the curved edge portion 105c of the wall 103 rides along the pin 106 and maintains the latter at a constant radial distance from the optical axis so that the exposure time remains unchanged at its longest value of, for example, 1/30 sec., which is an exposure time suitable for exposures with flash illumination, and the size of the aperture during such flash illumination is selected simply by aligning the index 142 with a selected graduation of the scale section 143c. At this time the curved edge portion 105g of the wall 103 will confront the element 107 so that it is not possible to make a bulb exposure.

Thus, with the embodiment of FIG. 4 it is possible to provide three different types of controls, and in one of the possible types of controls, according to which settings are made according to light values, it is possible to provide the controls either manually or automatically according to the lighting conditions.

The embodiment of FIG. 5 includes a movable wall 150 located within the objective housing 151 and supported for turning movement on the inner tube 152. The housing 151 is fixedly carried by the front wall of the camera. The wall 150 is provided with diaphragm blade controlling slots 153 and 154 which also have the five curved portions 153a–153e and 154a–154e, and these slots have precisely the same curvatures as the slots 108 and 109 of the embodiment of FIG. 4. Moreover the movable wall 150 is provided at its outer edge with an exposure-time setting means 155 formed by the curvature of the outer edge of the wall 150, and the edge 150 has a curvature which is identical with that of the edge 105 of the wall 103, so that the exposure time is set with the embodiment of FIG. 5 in exactly the same way as with the embodiment of FIG. 4. The edge 155 is divided into sections 155a–155g which respectively correspond to the sections 105a–105g of the movable wall 103. The slots 153 and 154 respectively receive the pins 110 and 111 of the diaphragm blades 112 and 113 which are identical with and controlled in the same way as the diaphragm blades of FIG. 4. Furthermore, the movable wall 150 fixedly carries a pin 124 corresponding to the pin 124 of FIG. 4 and being identical therewith and actuated in the same way by the projection 125 of the light-responsive means described above and shown in FIG. 4. Thus, in all of these respects the embodiment of FIG. 5 is identical with that of FIG. 4.

In order to manually determine the exposure time and aperture settings, a manually engageable means is operatively connected to the movable wall 150, but in the embodiment of FIG. 5 this manually engageable means takes the form of a lever 156 which is pivotally connected by a pivot pin 157 to an adjusting ring 158 which is supported for turning movement about the exterior of the objective housing 151. A spring 160 is coiled about a pin 159 which is carried by the support ring 158, and one leg of the spring 160 engages a projection 161 which is fixedly carried by the adjusting ring 158, while the other leg of the spring 160 engages the surface 156a of the lever 156 and thus urges the lever 156 to turn in the direction of the arrow t about the pin 157. The lever 156 is provided with a projection 162 which carries a pin 163 which acts as a locking or detent pin, and this pin is located, in the position of the parts shown in FIG. 5, in the radial end portion 164a of the arcuate slot 164 which extends along a circle whose center is in the optical axis and which is formed in the stationary wall 165 of the support means, the movable wall 150 being turnable with respect to the stationary wall 165. The outer edge of the slot 164 forms detent or locking teeth 166 which cooperate with the pin 163 in a manner described below. By manual turning of the lever 156 in opposition to the spring 160 in a direction opposite to that indicated by the arrow t, the pin 163 extends into a notch formed in an arm 168 which is integral with and projects radially from the movable wall 150. When the pin 163 is in this latter notch of the arm 168, the pin 163 has been displaced through the radial end portion of the slot 164 into alignment with the arcuate portion thereof so that if the operator now turns the lever 156 in the direction of the arrow z the wall 150 will also turn in the direction of the arrow z while the pin 163 moves along the slot 164. The stationary wall 165 of the support means is also formed with an arcuate slot 167 which corresponds to the slot 123 and along which the pin 124 is capable of moving freely during turning of the wall 150 either manually or automatically. Moreover, the stationary wall 165 is formed with openings which form bearings for the pivot pins 114 and 115 of the blades 112 and 113, respectively.

As was the case with the embodiment of FIG. 4, a return spring 119 is operatively connected to the movable wall 150 to turn the latter back to the illustrated rest position where the pin 124 engages the upper end of the slot 167, and of course it will be noted that in the embodiment of FIG. 4 also the pin 124 is located adjacent the upper end of the slot 123 to limit the turning of the plate 103. The spring 119 is fixed at one end to a pin 169 which is fixedly carried by the wall 150 and at its opposite end to a pin 170 which is fixedly carried by the stationary wall 165, and this stationary wall carries the spring-guiding rib 122 which prevents the spring 119 from engaging the diaphragm blades, as mentioned above.

The lever 156 carries an index 171 which cooperates with the scale 172 fixedly carried by the front wall of the camera, and this scale 172 carries the graduation A for indicating the position of the parts for automatic operation, this graduation being located at one end of the scale section 172a which is provided with graduations indicating light values. Next to the section 172a, the scale 172 is provided with the section 172b carrying graduations which indicate aperture sizes and carrying the symbol which indicates that this is the scale portion to be used for bulb exposures, and the scale section 172b is followed by a scale section 172c also carrying graduations indicating aperture sizes and a symbol indicating that this is the scale section which is to be used for flash exposures.

In order to make automatic settings with the light-responsive structure described above, the light-responsive structure is operated in the same way so that the projection 125 will move in the direction of the arrow w and will thus turn the movable wall 150 with respect to the stationary wall 165 through an angular distance determined by the lighting conditions, and thus the exposure time and aperture will be automatically set in the manner described above in connection with FIG. 4. At this time the ring 158 remains stationary and the arm 168 moves past the pin 163 without engaging the latter so that while with the embodiment of FIG. 5 there is no indication of the light value which is automatically set nevertheless the movable wall 150 is easier to turn since it does not carry with it the manually-engageable structure which is used for manually turning the wall 150. Of course, at the end of the exposure the spring 119 will return the wall 150 to the position indicated in FIG. 5 where the notch of the arm 168 is aligned with the pin 163.

In order to provide manual setting the operator will turn the lever 156 in opposition to the spring 160 so that the projection 163 enters in the notch of the arm 168, and then the lever 156 is turned together with the ring 158 in the direction of the arrow z so that the pin 163 by engaging the arm 168 will displace the latter and the wall 150 therewith in order to provide manual setting in the manner described above. The pin 163 will now of course be displaced along the slot 164, and when the index 171 is located in alignment with a selected graduation of the scale 172 the operator releases the lever 156 so that the spring 160 will turn the pin 163 into one of the detent notches 166, and thus the wall 150 will be retained in opposition to the spring 119 in the selected angular position. The length of the arm 168 is such that when the pin 163 is in one of the detent notches 166 part of this pin still extends into the notch of the arm 168 so that the wall 150 cannot be displaced by the spring 119 from the selected position.

The control slots 153 and 154 of FIG. 5 are identical with the slots 108 and 109 of FIG. 4 and have the same relationship with respect to each other so that the turning of the wall 150 will produce the same diaphragm control as the turning of the wall 103, and moreover the edge of the wall 150 forms an exposure-time setting means identical with that formed by the edge of the wall 103 and having the same angular relationship with respect to the control slots 153 and 154 so that with the embodiment of FIG. 5 the angular turning of the movable wall 150 relative to the stationary wall 165 will produce the same controls as the turning of the movable wall 103 with respect to the stationary wall 116 of FIG. 4. Thus, whenever the index 171 is aligned with a graduation of the scale section 172a of the scale 172, the operator will simultaneously set into the camera a diaphragm and exposure-time setting corresponding to the selected light value, and at this time it is the slot portions 153b and 154b which determine the size of the diaphragm while the camming edge portion 155a cooperates with the pin 106 to determine the exposure time. At this time the edge portion 155d of the wall 150 prevents actuation of the bulb-exposure mechanism by preventing sufficient movement of the element 107 to take place, also as described above.

Of course, with the embodiment of FIG. 5 only the plate 150 will turn during automatic setting of the camera and the index 171 will not indicate the light value to which the camera has been automatically set.

When the operator aligns the index 171 with a graduation of the central scale section 172b of the scale 172, it is the slot portions 153c and 154c which determine the size of the aperture while the edge portion 155e of the wall 150 is in alignment with the element 107 so that at this time the operator can make a bulb exposure, and in this case the influence on the exposure time provided by the cooperation of the edge portion 155b with the element 106 is insignificant in comparison to the manual determination of the exposure time so that it is the manual determination of the exposure time which will control.

In the event that the operator decides to make an exposure with flash illumination, the operator will place the index 171 in alignment with a selected graduation of the scale section 172c of the scale 172, so that in this case the size of the aperture will be controlled by the slot portion 153e and 154e while the exposure time will be controlled by the edge portion 155c of the movable wall 150, and this edge portion 155c will maintain the exposure time constant at a value suitable for flash exposure, as was pointed out above. At this time it is the edge portion 155g of the wall 150 which confronts the element 107 so that the operator cannot make a bulb exposure. During the transfer of the index 171 from the section 172b to the section 172c of the scale 172, the slot portions 153d and 154d control the aperture for a relatively short angular turning of the wall 150, so that in this way the largest aperture is maintained for a predetermined angular turning of the wall 150, in order to guarantee that the edge portion 155g is located opposite the element 107 by the time the index 171 reaches the first graduation of the scale 172c.

The embodiments of FIGS. 4 and 5 are not necessarily limited to the details disclosed in the drawing and described above. For example, a diaphragm of the type shown in FIG. 3 may be used with the embodiments of FIGS. 4 and 5, and of course in this case the control slots would be in the diaphragm blades while the pins would be on the rotary wall, as described above in connection with FIG. 3. Moreover, the sequence of the various scale portions and control curves can be changed and in addition within each scale portion and within each control section of the control slots and the camming edge portions it is possible to provide any type of predetermined controls of the diaphragm and aperture, as pointed out above in connection with the other embodiments.

It will be understood that each of the elements described above, or two or more together, may also find a useful application in other types of cameras differing from the types described above.

While the invention has been illustrated and described as embodied in camera controls, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means including a stationary wall located in a plane normal to the optical axis; a movable wall carried by said support means for movement relative to said stationary wall thereof; diaphragm blade means; connecting means connecting said blade means to one of said walls for movement relative thereto, pin-and-slot means connecting said blade means to the other of said walls and including at least one slot of a predetermined curvature which will position said blade means to provide an exposure aperture determined by the position of said movable wall relative to said stationary wall, said slot having different portions each of which provides substantially the same range of exposure apertures; and exposure-time setting means carried by said movable wall for movement therewith and providing for each exposure aperture determined by the position of said movable wall a corresponding exposure time also determined by the position of said movable wall, said exposure-time setting means providing different exposure times for said different slot portions, respectively, so that more than one exposure time can be provided for each of a series of exposure apertures.

2. In a camera as recited in claim 1, manually-engageable means connected to said movable wall so that the latter may be manually positioned.

3. In a camera as recited in claim 1, light-responsive means operatively connected to said movable wall for moving the latter automatically through a range in which one of said slot portions determines the exposure apertures; and manually-operable means operatively connected to said movable wall for positioning the latter in said range manually instead of automatically at the option of the operator.

4. In a camera as recited in claim 1, pivot means mounting said blade means on said one of said walls for turning movement relative thereto.

5. In a camera as recited in claim 1, guide means guiding said blade means on said one of said walls for shifting movement relative thereto.

6. In a camera as recited in claim 1, said exposure-time setting means being a cam means carried by said movable wall for movement therewith and forming an edge of said movable wall.

7. In a camera as recited in claim 1, said diaphragm blade means including a pair of diaphragm blades and said connecting means connecting said pair of blades to said stationary wall for turning movement relative thereto respectively about a pair of axes which are parallel to the optical axis, said pin-and-slot means connecting said pair of blades to said movable wall and including a pair of slots formed in said movable wall and a pair of pins fixed to said blades and respectively located in said slots, said movable wall being supported by said support means for turning movement about the optical axis.

8. In a camera as recited in claim 1, said diaphragm blade means including a pair of diaphragm blades and said connecting means connecting said blades to said stationary wall for shifting movement relative thereto while said blades remain perpendicular to the optical axis, said pin-and-slot means connecting said pair of blades to said movable wall and including a pair of slots respectively formed in said blades and a pair of pins fixedly carried by said movable wall and respectively located in said slots, said movable wall being supported by said support means for turning movement about the optical axis.

9. In a camera as recited in claim 1, means participating in the provision of bulb exposures, and said exposure-time setting means having a portion cooperating with said latter means to permit bulb exposures to be made in a given range of positions of said movable wall, said latter range of positions provided through one of said slot portions a complete range of exposure apertures.

10. In a camera as recited in claim 1, said exposure-time setting means including a portion which maintains the exposure time constant at a value suitable for flash exposures, and said slot having a portion which provides a complete range of exposure apertures while said portion of said exposure-time setting means maintains said constant exposure time.

11. In a camera as recited in claim 1, at least two of said slot portions providing the same aperture at the end of one of said two slot portions and at the beginning the other of said two slot portions, said end and beginning of said slot portions respectively adjoining each other.

12. In a camera as recited in claim 1, light-responsive means operatively connected to said movable wall for moving the latter automatically through one range of exposure apertures in which one of said slot portions determines the exposure apertures; and manually-operable means operatively connected to said movable wall for manually positioning the latter in at least another range of exposure apertures with different exposure times.

13. In a camera as recited in claim 12, said manually-operable means comprising manually operable engaging means carried by said movable wall; stationary holding means, said manually operable engaging means cooperating with said stationary holding means for manually positioning said movable wall.

14. In a camera as recited in claim 12, said manually-operable means comprising manually operable engaging means carried by a movable setting means; stationary holding means; said manually operable engaging means cooperating with said movable wall and said stationary holding means for manually positioning said movable wall.

References Cited by the Examiner

UNITED STATES PATENTS

| | | | |
|---|---|---|---|
| 2,969,007 | 1/61 | Groger | 95—10 |
| 2,999,440 | 9/61 | Nerwin | 95—10 |
| 3,098,421 | 7/63 | Ohara | 95—64 |

NORTON ANSHER, *Primary Examiner*.